Jan. 19, 1965   J. W. HENLEY   3,166,333
ARTICULATED SEAL
Filed May 18, 1961

*INVENTOR.*
JOHN W. HENLEY
BY
Oberlin, Maky & Donnelly
ATTORNEYS

3,166,333
ARTICULATED SEAL
John W. Henley, Willoughby, Ohio, assignor to The Eagle-Picher Company, Cincinnati, Ohio, a corporation of Ohio
Filed May 18, 1961, Ser. No. 110,972
8 Claims. (Cl. 277—199)

The present invention relates to an articulated or segmented seal and, more particularly, to a multi-part seal for enclosing oscillatory, rocking or otherwise angularly related members defining a joint, bearing, or the like.

It is difficult to seal suitably a joint or union defined by two members angularly mounted with respect to each other, particularly when there may be a high degree of angular movement between the members. To a considerable extent, a similar problem is met when one member of a joint is to rotate about a longitudinal axis while the other is relatively stationary. For example, in applications involving ball joints for automobiles it is desired to provide a seal effective for extended periods of time, thereby enabling guarantees of use of many thousands of miles. However, frequent and extensive pivoting or turning movement of one member of a ball joint or steering joint makes effective sealing of such joints most difficult.

Soft rubber can be sufficiently distorted to accommodate a large turning, including angular turning or pivoting, of one part of a joint with respect to the other. Soft rubber, however, does not have the desirable physical characteristics needed, such as resistance to wear, abrasion and aging.

On the other hand, harder rubber has the desired physical characteristics but resists distortion. Moreover, it is not only virtually impossible to mold a single, integral seal from such harder rubber on a mass production basis, but other objections arise during use of such seals. For instance, seals molded from relatively hard rubber acquire what is termed in the art as "muscle" in the mold after setting and are removed from the mold only with difficulty due to the intricate shapes of an integral one piece seal. Further, in assembling such seals about a joint, the seals are often necessarily stressed even though the members of the joint are linearly disposed, that is, not in an extended angular position. Thereafter, when the members are so related, the stress in the seal becomes even greater. This tends to concentrate the stress at a central portion of a single integral seal. Still further, since heat generated during flexing of a seal varies with the hardness of the rubber, a seal prestressed in assembly will automatically subject itself to a greater amount of heat by augmenting the stress during flexing of the seal.

It is, therefore, a principal object of the present invention to provide a seal that accommodates a high degree of movement, particularly angular or other turning movement, between the members of a joint such as a ball joint.

Another object is to provide a seal that may be assembled about a joint in an essentially unstressed condition.

A further object is to provide an articulated seal composed of relatively hard rubber.

A still further object is to provide an articulated seal for angularly related members which is adapted to spread the stress due to flexing over a relatively large area of the seal as the members are moved angularly with respect to each other.

Other objects will become apparent as the description proceeds.

To the accomplishment of the foregoing and related ends, the invention consists of the features hereinafter fully described and particularly pointed out in the claims, the annexed drawing and following disclosure describing in detail the invention, such drawing and disclosure illustrating, however, but one or more of the various ways in which the invention may be practiced.

Figure 3:
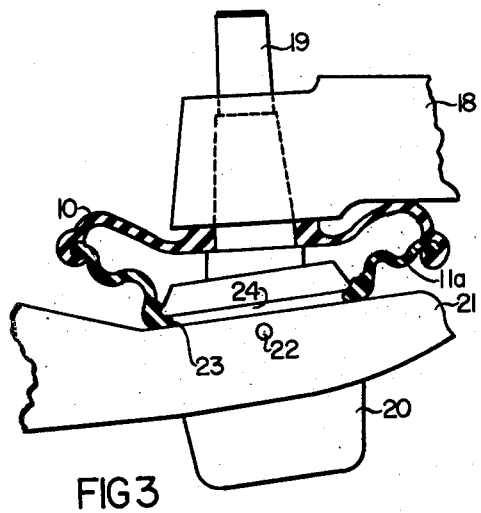
FIGURES 3 and 4 are side views of a conventional ball joint and illustrate the extensive flexing possible with the present seal, the component parts of the latter being shown in section.
Figure 1:
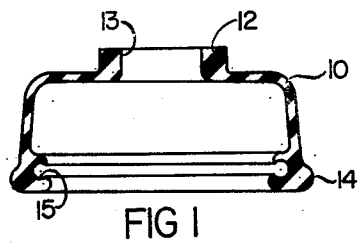
FIGURES 1 and 2 are diametric axial sections of two unstressed cooperating parts forming one embodiment of the present seal.
Figure 2:
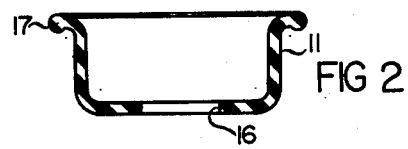

The present seal comprises two cooperating enclosing members having peripheral portions disposed in substantial registry with each other, one peripheral portion having means to grip the other. The peripheral portion of one such member may, for example, be designed to fit within the peripheral portion of the adjoining member, such as by having terminals constituting a male and female fitting. Relatively hard rubber, preferably having certain ranges of physical properties as hereinafter described, can be used in making the component members of the seal. The preferred material is polyurethane.

Referring to the embodiments of FIGURES 1 through 4, the cooperating parts of a seal may include a pair of open ended, flexible, elastomeric, semi-spherical or cup-shaped members 10 and 11. Cup-shaped or dome-shaped member 10 has a hub 12 forming an opening 13 through which to receive an arm or like element forming part of the joint. At the opposite end, member 10 terminates in an enlarged circumferential rim portion 14 having a groove 15 disposed radially inwardly. Member or cover 11 similarly has an opening 16 through which to pass an arm or like element defining part of the joint and at its opposite larger end terminates in a circumferential, outwardly disposed rim 17 having a cross-sectional configuration, usually bead-shaped, to match that of the groove 15. One advantage of this embodiment, in which the groove 15 is disposed inwardly and the annular rim 14 disposed outwardly, is that the rim 14 protects or shields the union of the covers 10 and 11 from external blows and like forces tending to separate the elastic covers.

Figure 4:
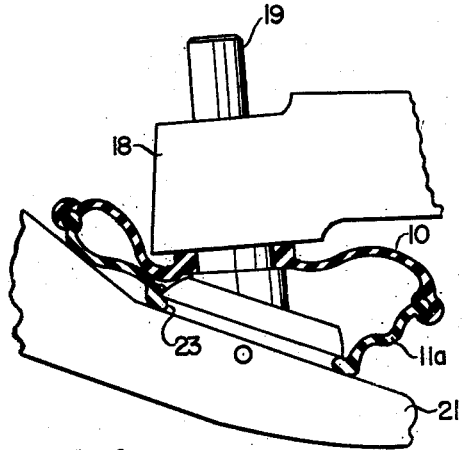

In assembling the present seal, the semi-spherical covers 10 and 11 are individually fitted through the openings 13 and 16, respectively, about the members intended to receive them. This enables the covers to assume a desired position with practically no pre-stressing. The rim 17 is then fitted in the groove 15. FIGURES 3 and 4 illustrate such installations. A mount 18 carries an arm 19 which seats in a socket member 20. A platform 21 carries the socket member and is adapted to pivot on a pin 22 with respect to a support member not shown. The arm 19 and socket member 20 may constitute a ball joint of standard structure and are therefore not described in detail. Also, if desired, the arm 19 may rotate about a longitudinal axis.

FIGURES 3 and 4 also illustrate the extensive distortion possible with the present seal which need not be uniform from side-to-side as shown especially in FIGURE 4. Such stressing as is impressed by flexing is spread over a much wider area of the members 10 and 11 than has heretofore been the case with the normal type of seal. The cover 11a shown in FIGURES 3 and 4 is similar to the corresponding cover 11 of FIGURE 2 except that the smaller end of the dome-shaped part forming the opening 16 is somewhat enlarged and has a radially inwardly disposed rim or bead portion 23 which nests within a groove 24 encompassing the socket 20. Opening 13 of the cover 10 receives the arm 19 as shown in FIGURE 3.

Figure 5:
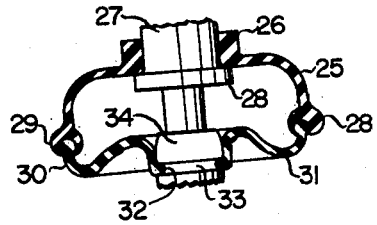

In the embodiment of FIGURE 5, a semi-spherical shell 25 has an enlarged hub portion 26 to receive an arm 27 and seats as well on a flange 28 integral with the arm. However, in this case a groove 28 in an enlarged rim portion 29 is directed substantially axially of the cover 25 toward a mating lip or bead portion 30 of a cooperating cover 31. In an unstressed state, lip portion 30 constitutes a straight continuation of the side of cover 31. The smaller opening of this cover is formed by a radially inwardly extending rim 32 which seats in a groove 33 of element 34 similar to the embodiment of FIGURES 3 and 4, the element 34 and arm 27 forming a joint and being capable of individual turning, and rocking.

Figure 6:
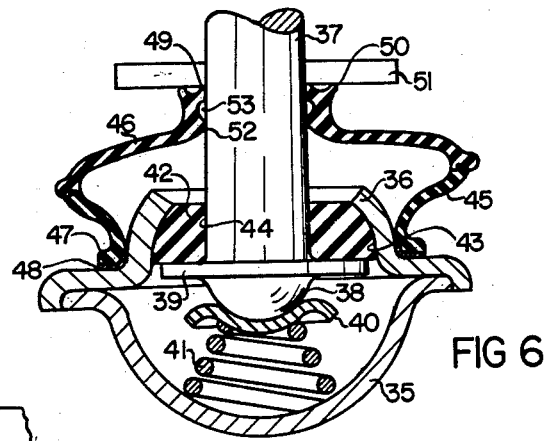
FIGURES 5 and 6 are side views of joints, each illustrating a modified form of the seal, the latter and part of the joint of FIGURE 6 being shown in section.

FIGURE 6 illustrates a further modification. A universal ball joint comprises a cup 35 and an open cover 36 suitably secured together. A shaft 37 extends through the opening of the cover 36 terminating in a rounded end 38 and a radial flange 39. The end 38 seats on a curved nosepiece 40 supported by a coiled spring 41. An annular rubber grommet 42 separates the cover 36 and the arm 37 and permits angular movement along the interface indicated at 43 and rotary movement at the interface shown at 44.

The seal of FIGURE 6 includes semi-spherical covers 45 and 46 having adjacent peripheral portions provided with a matching and engaging ring and groove configuration as shown. The lower open end of cover 45, as depicted in FIGURE 6, has an outwardly extending radial flange 47 which seats about the joint cover 36. An annular metal insert 48 may be embedded in the elastomeric cover if desired.

The upper hub portion of cover 46 has feathered or knife edges 49 and 50 defining a pair of concentric rings, each of which bears snugly against a plate 51 to keep out dirt, moisture, and the like. The plate 51 may be integral with the arm 37 or otherwise supported with respect to this arm to maintain a close position as shown. In addition, the cover 46 may have an internal circumferential annular bead 52 spaced from the adjacent edge or lip 49 to define therebetween a cavity 53 to contain a lubricant.

Where use of the present seal is not under severe conditions, it is possible and within the contemplation of the invention to permit the interfitting parts of the covers to move or shift relatively to each other. For example, in the embodiments of FIGURES 1 and 2, the rim or bead portion 17 can by slight undersizing be free to move or slightly turn within the groove 15 without separating the covers. This structure has the advantage of tending to relieve any excessive build-up of stress during severe flexing of the parts.

However, if it is desired to ensure against any possibility of separating the semi-spherical covers, the interfitting parts should be made tightly to grip each other. An adhesive or cement may be used between such parts as a further safeguard against separation. Such adhesive or cement may comprise any known rubber cement, polyurethane-based adhesive, epoxy resins, and the like.

As indicated, by means of the present seal structure, relatively hard rubber may be used. Since the seal is fabricated in sections, the problems of molding a hard rubber are considerably simplified, and the parts which are generally of single curvature can be removed from the mold without difficulty. Among the harder rubbers which may be used to make the present seals are chloroprene, butadiene-acrylonitrile polymers, butadiene-styrene polymers, vulcanized natural rubber, and the like. Rubbers known in the art as "hard" rubbers may also be obtained under the tradenames Ace, Luzerne, Stockohard, and Stocko-Therm. Preferably, elastomeric materials used to make the present seals have a hardness within the range of about 75 to about 95 Shore "A"; an elongation within the range of about 200 percent to about 600 percent; and a resiliency within the range of about 50 percent to about 80 percent. By elongation is meant those values obtained by ASTM test No. D412-51T. By resiliency is meant those values obtained by Yerzley ASTM test No. D945-59.

The preferred material from which to fabricate the seal has been found to be polyurethanes and especially cross-linked polyurethanes. Any suitable formulation may be used to produce the polyurethane rubber. For example, suitable formulations and starting materials for polyurethane are disclosed in U.S. Patents 2,620,516; 2,621,166; 2,729,618; 2,764,565; and 2,778,810, such patents hereby being incorporated by reference.

Generally a polyurethane is prepared by reacting an organic compound having reactive hydrogen atoms, such as for example a polyester, a polyalkylene-ether glycol, a polyesteramide, a polyalkylene-thioether glycol, and the like with an organic polyisocyanate. Various compounds which may serve as the defined organic compound and polyisocyanate are disclosed in the cited patents. Suitable activators, such as those also disclosed in the mentioned patents, may be used in forming the polyurethane. The activator and isocyanate may be injected into a confined stream of the organic compound having the reactive hydrogen atoms in accordance with the process of U.S. Patent No. 2,764,565. The resulting mixture is then poured into the mold until chemical reaction and curing has taken place. Curing may be accelerated by heating the closed mold to temperatures of 100° C. or more.

One method of preparing a cross-linked polyurethane comprises reacting the organic compound having active hydrogen atoms, such as the polyester, with an excess of the organic polyisocyanate needed to react with such organic compound and form an isocyanate-terminated linear polymer. A cross-linker, sometimes also referred to as a chain-extender, is then reacted with the terminal isocyanate groups of such linear polymers to link linearly two or more of such polymers together to produce a still longer linear polymer. Such a cross-linker may include polyalcohols, such as butane diol, ethylene glycol, propylene glycol, butylene glycol, glycerol. Also the cross-linker may comprise trimethylol propane, hydroquinone, and 1,4-di-(hydroxyethyl) benzene, and still other compounds known in the art having active hydrogen atoms.

The chain extended linear polymer contains within the polymeric chain reactive hydrogen atoms which furnish reaction sites for the cross-linking reaction. When the active hydrogen atom is on a urethane group the reaction is by allophonation. When the active hydrogen atom is on a urea group a biuret is formed. To produce a cross-link at the sites indicated, a polyisocyanate-terminated compound is thought to react one of its isocyanate groups with an active hydrogen atom of one linear polymer and another of its isocyanate groups with a reactive hydrogen atom of another linear polymer.

Although certain joints such as a ball joint has been shown, it will be apparent that the concept of the present articulated seal is readily adapted to accommodate as well various other joint or bearing structures as, for example, illustrated in U.S. Patents No. 1,959,259 and No. 2,235,002, which are hereby incorporated by reference, and still others.

Other forms embodying the features of the invention may be employed, change being made as regards the features herein disclosed, provided those stated by any of the following claims or the equivalent of such features be employed.

I therefore particularly point out and distinctly claim as my invention:

1. A seal for enclosing a joint defined by two members adapted for movement with respect to each other about a common point of the joint, said seal comprising two substantially cup-shaped elastomeric members of hard rubber having rim portions disposed substantially in registry with each other, the rim portion of one cup-shaped member having a circumferential groove, the rim portion of the other cup-shaped member having a circumferential lip portion adapted snugly to engage such groove, each of the cup-shaped members having means to engage one of the relatively movable joint members, said hard rubber of the cup-shaped members providing desirable wear characteristics and yet enabling by said defined structural relation therebetween a distribution of the forces attendant flexing over a relatively wide area of the cup-shaped members as said joint members are moved with respect to each other.

2. The seal of claim 1 wherein the rim portion of the cup-shaped member having the circumferential groove is enlarged with respect to the thickness of that member to define a bead extending circumferentially around said member, and wherein the groove is located in such bead and disposed radially inwardly of the cup-shaped member, the bead serving to protect the resulting union of said cup-shaped members from external forces tending to separate them.

3. The seal of claim 1 wherein said engaged lip portion and circumferential groove are free to move relatively to each other without separating the cup-shaped members to facilitate maintaining said members in a substantially unstressed condition.

4. In a joint defined by two members, engaged for oscillatory, rocking, or other related motion, having a seal enclosing the joint, the improvements of a multi-part seal including a pair of hollow dome-shaped elastomeric members of hard rubber having circumferential rim portions disposed substantially in registry with each other, each member of hard rubber being of substantially a single curvature and thereby readily moldable, the rim of one dome-shaped member having a circumferential groove, the rim of the other dome-shaped member having a circumferential bead portion adapted snugly to engage such groove and thereby enabling assembling such members about the joint in a substantially unstressed state, each of the dome-shaped members having an opening substantially at the apex of the dome to receive therethrough and engage one of the relatively movable members, said openings constituting substantially the only contact by the dome-shaped members with the joint, said hard rubber of the dome-shaped members providing desirable wear characteristics and yet enabling, by said defined structural relation, a distribution of the forces attendant flexing over a relatively wide lateral area of the dome-shaped members as the joint members are moved with respect to each other.

5. The seal of claim 4 wherein the opening of one of said dome-shaped members, adapted to receive therethrough one of said joint members, terminates in feathered lip portions effective snugly to engage an abutment and define a seal.

6. The seal of claim 5 wherein said one dome-shaped member further includes an internal circumferential bead spaced from such opening and cooperating with an adjacent lip portion to define therebetween a circumferential cavity to contain a lubricant.

7. An articulated seal for enclosing a joint defined by two endwise related members adapted for relative movement with respect to each other about their adjacent ends, said seal comprising a pair of hollow substantially semi-spherical elastomer covers consisting essentially of polyurethane and having circumferential rim portions disposed substantially in registry with each other, each polyurethane cover being of substantially a single curvature and therefore readily moldable and removable from a mold, the rim of one semi-spherical polyurethane cover having a circumferential groove, the rim of the other polyurethane cover having a circumferential lip portion adapted snugly to engage such groove and thereby enabling assembling such covers about the endwise related members in a substantially unstressed condition, each of the polyurethane covers also having an opening to receive therethrough and engage one of said endwise related members, said openings forming substantially the only contact by the covers with the joint members and thereby freeing for flexing movement the balance of the articulated covers, said polyurethane having a hardness within the range of about 75 to about 95 Shore "A," an elongation within the range of about 200 percent to about 600 percent, and a resiliency within the range of about 50 percent to about 80 percent in order to provide desired wear characteristics and yet by said defined structural relation between the covers enable a distribution of the forces attendant flexing over a relatively wide area thereof as the endwise related members are moved with respect to each other.

8. The articulated seal of claim 7 wherein said elastomeric covers consist essentially of a cross-linked polyurethane.

References Cited in the file of this patent

UNITED STATES PATENTS

| | | |
|---|---|---|
| 2,197,037 | Gardner | Apr. 16, 1940 |
| 2,392,085 | Ferrel | Jan. 1, 1946 |
| 2,467,370 | Christensen | Apr. 19, 1949 |
| 2,889,089 | Herrick et al. | June 2, 1959 |
| 3,007,728 | Hoffman | Nov. 7, 1961 |